(12) United States Patent
Kim et al.

(10) Patent No.: US 11,937,737 B1
(45) Date of Patent: Mar. 26, 2024

(54) TABLE AIR CIRCULATION ROASTER WITH SAFETY FUNCTION

(71) Applicants: Hoon Kim, Daegu (KR); Chan Park, Federal Way, WA (US); Yong Goo Cho, Daegu (KR)

(72) Inventors: Hoon Kim, Daegu (KR); Chan Park, Federal Way, WA (US); Yong Goo Cho, Daegu (KR)

( * ) Notice: Subject to any disclaimer, the term of this patent is extended or adjusted under 35 U.S.C. 154(b) by 0 days.

(21) Appl. No.: 18/227,829

(22) Filed: Jul. 28, 2023

(51) Int. Cl.
*A47J 37/07* (2006.01)

(52) U.S. Cl.
CPC ................ *A47J 37/0754* (2013.01)

(58) Field of Classification Search
CPC ...... A47J 37/0754; A47J 43/28; A47J 43/283; A47J 43/00; A47J 37/041; A47J 37/042; A47J 37/049; A47J 43/18; A47J 27/04

USPC .................. 99/331, 419, 427, 446, 448, 473
See application file for complete search history.

(56) References Cited

U.S. PATENT DOCUMENTS 6,123,014 A * 9/2000 Jo ........................ A47J 37/041
219/400

* cited by examiner

*Primary Examiner* — Phuong T Nguyen

(57) ABSTRACT

An air circulation roaster for tables with a safety function enabled to remove foreign substances (oil and nitrogen dioxide) generated during cooking of meat, reducing contamination of the air around the roaster, has a safety function that cuts off power pending the sensed temperature of the roast plate. The air circulation roaster has a temperature sensor detecting the temperature of the roast plate, a control box placed outside the body when the temperature cuts off power supplied to the heating lamp when the heating unit exceeds the set limit. A platinum catalyst filter placed around the outside of the heating unit is coated with platinum on a network-shaped ceramic.

10 Claims, 3 Drawing Sheets

TABLE AIR CIRCULATION ROASTER WITH SAFETY FUNCTION

TECHNICAL FIELD TO WHICH INVENTION PERTAINS

This invention is about a "table air circulation roaster for table with a safety function" which removes foreign substances (oil, nitrogen dioxide) generated in the process of cooking meat so as to reduce air pollution around the roaster and cuts off power depending on the temperature of the grill plate.

The Technology Behind an Invention

When meat is cooked using heat such as charcoal, moisture (meat juice) and oil (fat) evaporate and smoke spread out around. At this time, moisture and oil generated from meat come into contact with the table around the roaster cooking meat or the wall of the building, causing the smell to seep or become soggy.

Therefore, restaurants that typically heat on meat tables are equipped with an inlet at a certain distance from the roasting plate (grill) to cook meat, such as Korean Patent Laid-Open No. 10-2000-0072768 "DEVICE FOR REMOVING SMELL AND SMOKE OF TABLE ROASTER", the blower installed in front of the inlet absorbs the mixed air (water, oil, smoke) generated in the process of cooking the meat and discharges it to the outside of the building or to a separate container.

However, this structure has a problem in that the suction port located on the grill plate blocks the user's view or interferes with the action of turning meat over on the grill.

Korea Patent No. 10-1114290 "Electric roaster" is disclosed as a prior art in which the above problems are improved.

This technology is configured to inhale air mixed with foreign substances generated in the cooking process of meat by surrounding the side circumference of the roasting plate heating meat, to circulate air inside the roaster body, and to discharge air inside the roaster.

The roaster made by using this technology has some problems, due to the air from which foreign substances were not smoothly removed through the outlet, the environment around the roaster cooking meat was contaminated with foreign substances or the smell of meat around.

In addition, as in the Korea Registered Patent No. 10-2473291, "Air circulating roaster", as the roaster is equipped with a heating lamp that converts electricity into heat, a fire may occur due to overload or disconnection, so a means to prevent it should be prepared.

PRIOR ART DOCUMENTS

Patent Documents (Patent documents 01) Korea Patent Publication No. 10-2000-0072768 "DEVICE FOR REMOVING SMELL AND SMOKE of ROASTER for TABLE".
(Patent documents 02) Korea Patent No. 10-1114290 "Electric roaster".
(Patent documents 03) Korea Patent No. 10-2473291 "Air circulating roaster".

DESCRIPTION OF THE INVENTION

Problem to be Solved of the Invention

In cooking meat using a heating lamp that converts electricity into heat, removes foreign substances generated by circulating the air in the process of cooking the meat in the roaster using a blower made of a motor and a fan, the main problem of this invention is to detect abnormal conditions such as overload or disconnection of the heating lamp and roaster, in addition, the main problem of this invention is to detect abnormal conditions such as overload or disconnection of heating of the lamps and roasters, and to prepare a means to prevent accidents such as fire.

Besides, another problem of this invention is to provide a means to effectively remove foreign substances (oil, nitrogen dioxide) in the air generated during the cooking process of meat.

Means to Solve Problems

The "air circulating roaster for table with a safety function" of the present invention is composed of a cylindrical container with an open top, consists of the following structures: A body (10) with a second hole (11) which is a portion of the center of the bottom surface is vertically penetrated is formed, a heating part (20) which emits heat from the inner center of the body (10) to cook meat, and a heating part located on the upper surface of bottom of the body (10) is configured to support from below; A bottom container (31) with an open-bottom and the third penetration holes (31a) at regular intervals on the side, an insulation support (30) with an insulation container (32) positioned between the bottom container (31) and the heating part (20) to support the heating part (20) vertically spaced apart from the bottom container (31); A lower ring (41) which has a cylindrical shape with open upper and lower surfaces and is inserted between the insulation support (30) and the body (10) to contact the bottom surface inside the body (10), an oil tray (42) which is positioned at an upper side of the lower ring (41) and to contain some water (W) therein, a table ring (43) is positioned at an upper side of the oil tray (42) and has the first penetrating hole (43a) formed at regular intervals in an outer surface; A roasting plate is positioned at the upper side of the heating part (20), the heat generated by the heating part (20) is transferred to cook meat, and the roasting plate (50) has an oil outlet (51) formed at regular intervals on the upper side where the oil tray (42) is located; A motor (61) which converts electrical energy into rotational motion so that air mixed with foreign substances (oil) generated from meat placed on the roasting plate (50) is sucked into the first air layer (R1) formed between the outer insulation part (40) and the body (10) through the first penetrating hole (43a), a blower (60) with a fan (62) rotating by a motor (61) to form an air flow; A bottom cap (70) having an open-upper part and a second air layer (R2) formed therein and with a passage (71) in which the air mixed with foreign substances located in the first air layer (R1) flows into the second air layer (R2) by the blower (60); A temperature sensor (80) which detects the temperature of the roasting plate (50) is disposed so that the sensing part (81) located at the top is in contact with the bottom surface of the roasting plate (50); A control box (90) is placed outside the body (10) and cuts off the power supplied to the heating lamp (21) when the temperature of the heating part (20) exceeds the set limit; A platinum catalyst filter (110) coated with platinum on a net-shaped ceramic is disposed around the outer circumference of the heating part (20);

An oil discharging groove (E) having a gap at a certain interval is formed between the side surface of the heating part (20) and the oil tray (42), Foreign substances (oil, nitrogen dioxide) generated from meat heated on the roasting plate (50) are mixed in the air passes through the first penetrating hole (43a), the first air layer (R1), the second air layer (R2), the second penetrating hole (11), the third penetrating hole (31a), the third air layer (R3), oil discharging groove (E), oil outlet (51) and then flows back into the first air layer (R1) via pass through the first penetrating hole (43a) and circulates, the heat generated by the heating part (20) is conducted to the platinum catalyst filter (110), and nitrogen dioxide ($NO_2$) in the air generated during the cooking process of meat is decomposed into nitrogen ($N_2$) and oxygen ($O_2$).

A relay (100) located at the lower part of the temperature sensor (80) detects the weight of the roasting plate (50), when the roasting plate (50) is removed from the temperature sensor (80), an electric signal is sent from the relay (100) to the control box (90) to activate the alarm warning lamp (91) formed on one side of the control box (90) and to cut off the power supplied to the heating lamp (21).

A control box (90) detects the current size and pattern of the heating lamp (21) and the motor (61), activates the alarm warning light (91) formed on one side of the control box (90) in the event of an abnormality, and cuts off the supply of power to the place where the abnormality occurs.

An air exiting the discharge groove (E) hits the bottom of the roasting plate (50) so as to induce air to move toward the water (W) in the oil tray (42), and foreign substances in the air are removed from the air by contacting the water in the oil tray (42).

A blower (60) is placed inside the intake passage (12) so as to let air penetrate to the outside the body (10) and the first air layer (R1) communicate is formed on the body (10); A blowing hole (13) let air introduced into the intake passage (12) to be discharged toward the lower side of the first air layer (R1) by blower (60) installed between the intake passage (12) and the table ring (43), air moving toward the lower side of the first air layer (R1) through the blowing hole (13) pulls the surrounding air downward by the viscosity of the air, and the air on the roasting plate (50) is sucked through the first penetrating hole (43a).

A water tank (121) with an open-top and containing a certain amount of water (W) inside, and placed in the inner center of the bottom cap (70), a heater (122) for heating water contained in the water tank (121) under the water tank (121) to vaporize into a water vapor state, a wire mesh (123) disposed above the water tank (121). A water (water vapor) of the water tank (121) evaporated by the heater (122) is condensed by contacting the wire mesh (123) disposed on the upper side of the water tank (121), foreign substances in the air are removed by contacting and adsorbing foreign substances (oil) in the air with water condensed in the wire mesh (123).

A wire mesh (123) has a larger horizontal area than the water tank (121), and the center thereof protrudes downward.

A plasma generator (131) is arranged on the one side of the passage (71) penetrates, so that removes foreign substances passing through the passage (71).

An air pipe surrounding the side circumference of the plasma generator (131) and penetrating at both ends; A blowing device (not shown in the FIG.) is located near the air pipe (132), forms an air flow that introduced into the bottom cap (70), therefore plasma generated by the plasma generator (131) flows into the cap (70) and the body (10) from the air pipe (131).

Effects of the Invention

The effect of this invention, which consists of the aforementioned configuration, prevents fire by cutting off the power supplied to the heating lamp (21) when the temperature control of the heating unit (20) is not smoothly performed and exceeds the set limit.

When the roasting plate (50) is removed from the temperature sensor (80), the alarm warning light (91) formed on one side of the control box (90) operates by sending an electrical signal from the relay (100) to the control box (90) so as to cuts off the power supplied to the heating lamp (21), to prevent the user from being burned by the heat generated by the heating lamp (21) and the user's eyes from being tired by the light of the heating lamp (21).

The heat generated by the heating part (20) is conducted to the platinum catalyst filter (110), and nitrogen dioxide ($NO_2$) in the air generated during the cooking process of meat is decomposed into nitrogen ($N_2$) and oxygen ($O_2$) to remove harmful components to the human body.

An air exiting the discharge groove (E) hits the bottom of the roasting plate (50) so as to induce air to move toward the water (W) in the oil tray (42), and foreign substances in the air are removed from the air by contacting the water in the oil tray (42).

An intake passage (12) is provided on the body (10), which the outside of the body (10) and the first air layer R1 pass through each other; A blower (60) is provided inside the intake passage (12), a blowing hole (13) is provided to let air introduced into the intake passage (12) to be discharged toward the lower side of the first air layer (R1) by blower (60) installed between the intake passage (12) and the table ring (43), air moving toward the lower side of the first air layer (R1) through the blowing hole (13) pulls the surrounding air downward by the viscosity of the air, the air on the roasting plate (50) is sucked through the first penetrating hole (43a), thus the pollution of the fan can be reduced.

A water tank (121) with an open-top and containing a certain amount of water (W) inside, and placed in the inner center of the bottom cap (70), a heater (122) for heating water contained in the water tank (121) under the water tank (121) to vaporize into a water vapor state, a wire mesh 123 disposed above the water tank (121). A water (water vapor) of the water tank (121) evaporated by the heater (122) is condensed by contacting the wire mesh (123) disposed on the upper side of the water tank (121), foreign substances in the air are removed by contacting and adsorbing foreign substances (oil) in the air with water condensed in the wire mesh (123).

Since the horizontal area of the wire mesh (123) is made larger than that of the water tank (121), the water vaporized in the water tank (121) does not contact the wire mesh (123).

Since the center of the wire mesh (123) has a shape protruding downward, make the water condensed in the wire mesh (123) to fall at the center of the water tank (121), so preventes from escaping to the outside of the water tank (121) when water condensed in the wire mesh (123) drops down.

Foreign substances in the air passing inside the passage (71) can be removed by plasma generated by the plasma generator (131).

An air pipe surrounding the side circumference of the plasma generator (131) and penetrating at both ends; A blower (not shown in the FIG.) is located near the air pipe (132), forms an air flow that introduced into the bottom cap (70), therefore plasma generated by the plasma generator (131) flows into the cap (70) and the body (10) from the air pipe (131).

BRIEF DESCRIPTION OF FIG.S

SPECIFIC CONTENTS FOR CARRYING OUT THE INVENTION

Figure 1:
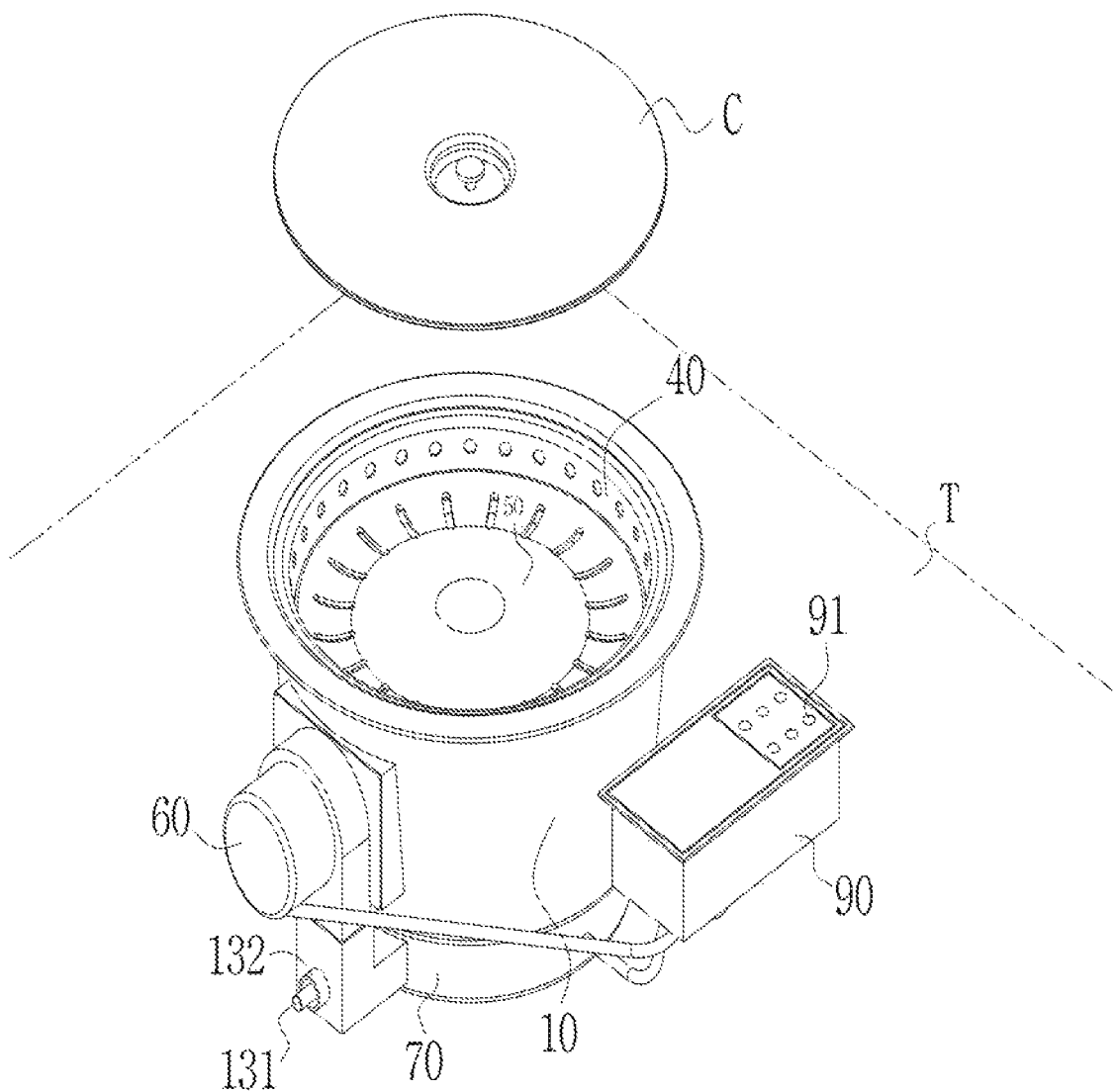
FIG. 1 is a perspective view of an "air circulation type roaster for a table with a safety function" of the present invention.
Figure 2:
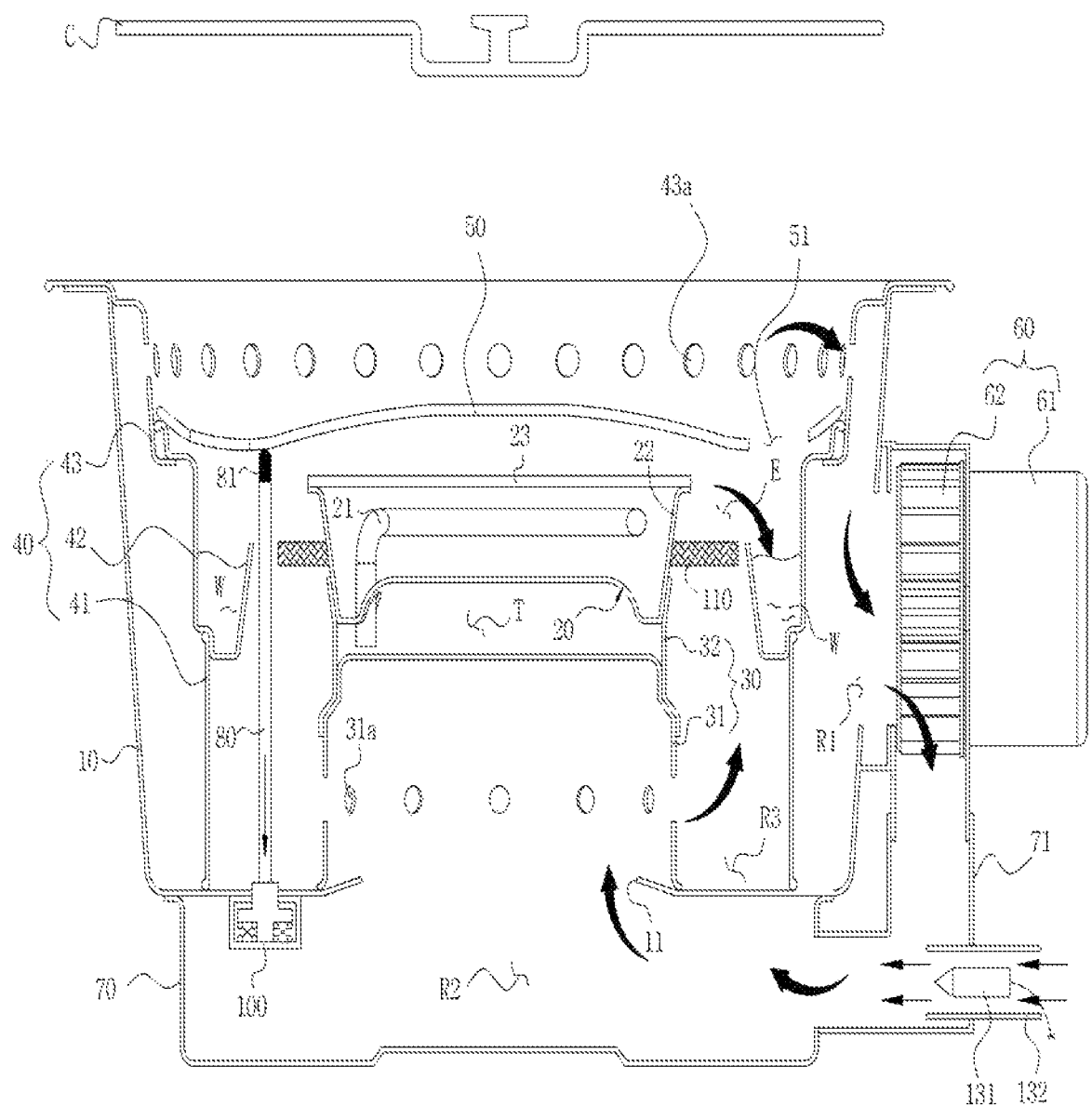
FIG. 2 is a longitudinal cross-sectional view of FIG. 1.

This invention is about a "air circulating roaster for table with a safety function" with a safety function that reduces air pollution around the roaster by removing foreign substances (oil, nitrogen dioxide) generated, and cuts off power depending on whether detecting the temperature of the roaster and settling properly in place, it consists of a body (10), a heating part (20), an insulation support (30), an outer insulation (40), a roasting plate (50), a blower (60), a bottom cap (70), a temperature sensor (80), a control box (90), a relay (100), and a platinum catalyst filter (110) as shown in FIGS. 1 and 2.

The 'air circulating type roaster for table equipped with a safety function' of the present invention can be installed to be buried in the table (T) of the restaurant as shown in FIG. 1.

The body (10) consists of a cylindrical container with an open-top, and a heating part (20) is installed to cook meat placed on the roasting plate (50) is cooked by dissipating heat from the inner center of the body (10).

A heating part (20) is equipped with a heating lamp (21) which emits heat using electricity and a heating container (22) which accommodates the above heating lamp (21) and reflects light and heat generated from the heating lamp (21) upward by opening the top.

A heating part (20) is further equipped with a glass diffusion plate (23) at the top of the heating container (22) to prevent light generated by the heating lamp (21) from being exposed to the outside, while preventing the upper surfaces of the heating lamp (21) and the heating container (22) from being contaminated by oil generated during the cooking process.

An insulation support part (30) is located on the upper side of the inner floor of the body (10), is configured to support the above heating part (20) from the bottom, and prevents the body (10) from overheating generated by the heating part (20) by setting the distance between the heating part (20) and the body (10).

An insulation support part (30) is formed in the following structure: A bottom container (31) with an open bottom and a plurality of third penetrating holes (31a) formed at regular intervals on the side, and an insulation container (32) positioned between the bottom container (31) and the heating part (20) to support the heating part (20) vertically spaced apart from the bottom container (31).

An air insulation layer (T) is formed between the heating part (20) and the insulation container (32), which reduces the transfer of heat generated by the heating part (20) to the body (10).

An outer insulation part (40) is spaced apart from the vertically connected heating part (20) and the insulation support (30) by a certain distance in the outer direction, and the first air layer (R1) is formed between the outer insulation part (40) and the body (10), thereby the heat generated by the heating unit (20) is reduced so as not to transfer to the side surface of the body (10).

An outer insulating portion (40) includes a lower ring (41), an oil tray (42) and a table ring (43).

A lower ring (41) has a cylindrical shape with open upper and lower surfaces, and is inserted between the insulation support (30) and the body (10) to contact the bottom side inside the body (10). In addition, at the top of the lower ring (41), an oil tray (42) is installed to receive oil from the meat placed on the roasting plate (50) and to accommodate a certain amount of water (W) inside.

An table ring (43) is provided at the top of the oil tray (42), and the first penetrating hole (43a) is formed at regular intervals on the outer surface, and the air mixed with foreign substances (oil) generated when heating the meat on the roasting plate (50) flows into the first penetrating hole (43a) by a blower (60) to be described later.

A roasting plate (50) is located on the heating part (20), and the heat generated by the heating part (20) is transferred to cook the meat after the meat is placed on the roasting plate (50). An oil outlet (51) is formed at regular intervals on the upper side of oil tray (42) of the roasting plate (50), and liquid oil generated from heating the meat on the roasting plate (50) flows into the oil tray (42) through the oil outlet (51).

An blower (60) is provided on the one side of body (10) to inhale air mixed with foreign substances (soft oil) generated from meat on the roasting plate (50) into the first air layer (R1) through the first penetrating hole (43a).

An blower (60) consists of a motor (61) which converts electrical energy into rotational motion and a fan (62) which rotates by the motor (61) to form air flow.

An embodiment of the blower (60) is shown in FIG. 2. A fan (62) can be formed between the first air layer (R1) and the passage (71), in which case the fan (62) is likely to be contaminated by foreign substances (oil) in the air, so the fan (62) must be cleaned frequently.

Figure 3:
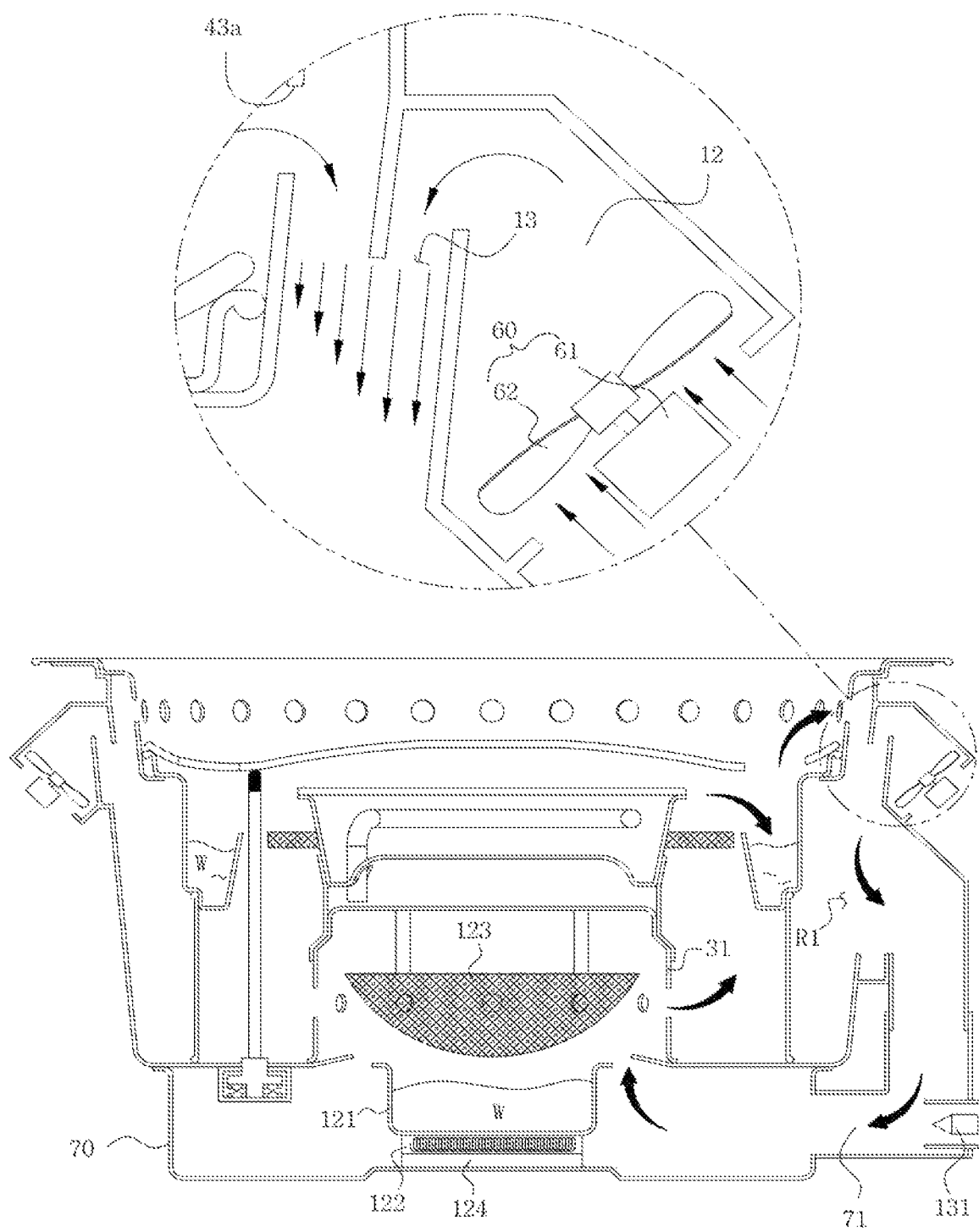
FIG. 3 is a longitudinal cross-sectional view according to another embodiment of the present invention.

An embodiment of FIG. 3 shows a structure which can reduce contamination of the fan (62), a body (10) has an intake passage (12) which the first air layer (R1) communicates with the outside of the body (10), a blower (60) is placed inside the intake passage (12), and blowing hole (13) is formed to be discharged the air toward the lower side of the first air layer (R1), which is introduced into inside of intake passage (12) by a blower.

An air moving through the blowing hole (13) and toward the lower side of the first air layer (R1) pulls the surrounding air downward by the viscosity of the air, thereby inhaling the air on the roasting plate (50) through the first penetrating hole (43a).

This structure can reduce the degree of contamination of the fan (62) by allowing the fan (62) of blower (60) to be placed outside the path between the first air layer (R1) and the passage (71). Provided that, since air has a lower traction efficiency due to viscosity than liquids such as water or oil, it is desirable to place two or more blower (60) around the body (10).

The bottom cap (70) has an open upper part and a second air layer (R2) is formed inside, and a passage (71) is formed on one side, in which air mixed with foreign substances located in the first air layer (R1) flows into the second air layer (R2) by the blower (60).

A second through hole (11) is provided in the body (10), which a portion of the center of the bottom surface is vertically penetrated.

As described above, the air mixed with foreign substances introduced into the second air layer (R2) passes through the second penetrating hole (11), and then passes through the third penetrating hole (31a) via inside of the bottom container (31).

The air mixed with foreign substances through the third penetrating hole (31a) flows into the third air layer (R3) formed between the insulation support part (30) and the outer insulation part (40), the moisture flowing into the third air layer (R3) is dried by heat emitted from the heating part (20), and the Oil in the air is removed by adsorbing to the wall of the insulation support part (30) and the outer insulation part (40).

Smoke is diluted by the air formed inside the first to third air layers (R1, R2, R3) as the air moves through the first to third air layers (R3) as described above.

A discharge groove (E) with a certain interval is formed between the side of the heating part (20) and the oil tray (42), so that the air from which some moisture and oil have been partially removed from the third air layer (R3) is discharged upward through the discharge groove (E).

An air escaping from the discharge groove (E) is induced to move toward the water (W) contained in the oil tray (42) by hitting the bottom of the roasting plate (50), and foreign substances in the air are removed from the air by contacting the water contained in the oil tray (42).

An air purified some of foreign substances by the water contained in the oil tray (42) escapes onto the roasting plate (50) through the oil outlet (51).

Some of the air of the roasting plate (50) escapes from the body (10), while some of the air are introduced into the first penetrating hole (43a) by the blower (60), flows back into the first air layer (43a) through the first air layer (R1), the second air layer (R2), the second through hole (11), the third through hole (31a), the third air layer (R3), the discharge groove (E), and the oil outlet (51), so the process of removing foreign substances (water and oil mixed in smoke and air) generated during the cooking of meat is continuously repeated.

In the process of cooking meat on the roasting plate (50), a reaction between the amino acid of meat and nitrogen in the air and nitrogen dioxide which is harmful to the human body is produced by the combustion of fat in meat. As a means for removing this, a platinum catalyst filter (110) is provided on the outer circumference of the heating part (20).

A platinum catalyst filter (110) is a structure coated with platinum on a network-shaped ceramic, and decomposes nitrogen dioxide ($NO_2$) in the air into nitrogen ($N_2$) and oxygen ($O_2$). The platinum catalyst filter (110) requires a temperature of 200° C. to 400° C. to effectively decompose nitrogen dioxide, and the platinum catalyst filter (110) must be placed adjacent to the heating part (20) so that the heat generated from the heating part (20) is transferred to the platinum catalyst filter (110).

As a means of removing foreign substances such as nitrogen dioxide and oil in the air circulating inside the roaster, a plasma generator (131) is provided, which penetrates one side of the passage (71) so that foreign substances in the air passing inside the passage (71) can be removed by plasma generated from the plasma generator (131).

An air pipe (132) with penetrating at both ends while surrounding the side circumference of the plasma generator (131) is provided, and an air flow flowing into the bottom cap (70) and the body (10) is formed through the air pipe (132) by a separate blowing device (not shown) near the air pipe (132).

At this time, the plasma generated by the plasma generator (131) moves from the air pipe (131) to the inside of the cap (70) and the body (10), so that the plasma can remove foreign substances in the air not only inside the passage (71) but also inside the cap (70) and the body (10).

An above cover (C) may be provided at the top of the table (43), and just covering the top of the table (43) in the process of cooking meat can shorten the cooking time by preventing heat from escaping upward.

A temperature sensor (80) and a control box (90) are provided to facilitate temperature control for the user to prevent meat from burning in the process of cooking meat and to maintain the set temperature value within the error range.

The temperature sensor (80) is provided so that the sensing part (81) located at the top is in contact with the bottom of the roasting plate (50), detects the temperature of the roasting plate (50), and transmits temperature to the control box (90) outside the body (10).

The control box (90) is equipped with an operation button that can set the temperature of the heating lamp (21), and supplies power to the temperature sensor (80), blower (60), and heating lamp (21).

If the temperature value of the heating part (20) measured by the temperature sensor (80) is higher than the temperature set by the user, the temperature can be lowered by lowering the current supplied by the control box (90) to the heating lamp (21), conversely, if the temperature value of the heating part (20) measured by the temperature sensor (80) is lower than the temperature set by the user, the temperature can be raised up by raising up the current supplied by the control box (90) to the heating lamp (21), so the temperature of the heating unit (20) may maintain within error range of the temperature value set by the user.

If the temperature of the heating unit (20) is not smoothly controlled even with the control box (90), so exceeds the set limit, prevents fire by cutting off the power supplied to the heating lamp (21) using the control box (90).

At the bottom of the temperature sensor (80), a relay (100) is equipped to detect the weight of the roasting plate (50) applied to the temperature sensor (80), and the relay (100) sends an electrical signal to the control box (90) depending on whether the roasting plate (50) is settled on the temperature sensor (80).

Since the weight of the roasting plate (50) is not detected in the relay (100) when the roasting plate (50) is removed from the temperature sensor (80), an electric signal is sent from the relay (100) to the control box (90) to operate the alarm warning lamp (91) on one side of the control box (90) and same time the power supplied to the heating lamp (21) is cut off to prevent the user from being burned by the heat generated by the heating lamp (21) and fatigue of the user's eyes due to the light of the heating lamp (21).

A control box (90) detects the current size and pattern of the heating lamp (21) and the motor (61), activates the alarm warning lamp (91) in the event of an abnormality, and cuts off the power supply to the place where the abnormality occurs between the heating lamp (21) and the motor (61).

When the heating lamp (21) and the motor (61) are short-circuited, the resistance of the short-circuited part decreases, and the current of the heating lamp (21) and the motor (61) measured in the control box (90) is higher than the reference value, when components such as bearings and decelerators in the motor (61) breaks down, the measured current pattern changes.

In the embodiment of FIG. 3, a water tank (121), a heater (122), and a wire mesh (123) are provided to remove oil from the air, this principle is as follows Water vapor is produced by heating water between the bottom cap and the bottom container, and evaporated water vapor is condensed so that oil in the air is adsorbed to the condensed water vapor.

A water tank (121) has a open upper part to accommodate a certain water (W) therein, and is disposed at an inner center of the bottom cap (70). Under the water tank (121), a heater (122) for heating the water contained in the water tank (121) is provided to vaporize the water in the water tank (121) into a steam state.

A water (water vapor) of the water tank (121) evaporated by the heater (122) is condensed by contact with the wire mesh (123) placed on the upper side of the water tank (121), and foreign substances (oil) in the air are adsorbed by contact with the water condensed in the wire mesh (123).

The water condensed in the wire mesh (123) falls back into the water tank (121) by gravity, repeating the vaporization and condensation process. In addition, the wire mesh (123) forms a larger horizontal area than the water tank (121), reducing the amount of water vaporized in the water tank (121) leaving without contacting the wire mesh (123).

A center of the wire mesh (123) has a protruding shape downward so that the water condensed in the wire mesh (123) falls into the center of the water tank (121), preventing the water condensed in the wire mesh (123) from escaping to the outside of the water tank (121).

The lower side of the heater (122) is equipped with a water tank (121) and a weight measuring device (124) to measure the weight of water contained in the water tank (121), and when the water in the water tank (121) is reduced to an appropriate amount, detects this and sends a signal to the control box (90) to stop the heater (122) and allow the alarm warning lamp (91) to operate so that the user can recognize it.

Explanation of the Lettering on the Plan

Body (10) Second penetrating hole (11)
Intake passage (12) Blowing hold (13)
Heating part (20) Heating lamp (21)
Heating container (22) Glass diffusion plate (23)
Insulation support (30) Bottom container (31)
The third penetrating hole (31a) Insulation container (32)
Outer insulation part (40) Lower ring (41)
Oil tray (42) Table ring (43) First penetrating hole (43a)
Roasting plate (50) Oil outlet (51)
Blower (60) Motor (61) Fan (62)
Bottom cap (70) Passage (71)
First air layer (R1) Second air layer (R2)
Third air layer (R3) Insulation layer (T) Discharging groove (E)
Temperature sensor (80) Sensing part (81)
Control box (90) Alarm warning lamp (91)
Relay (100) Platinum catalyst filter (110)
Water tank (121) Heater (122)
Wire mesh (123) Weight measuring device (124)
Plasma generator (131) Air pipe (132)

The invention claimed is:

1. An air circulating roaster with safety function for table comprising a body made of a cylindrical container with an open top, wherein the body having a second penetrating hole with a part of the center of the bottom surface penetrating up and down;
    a heating part which cooks meat by dissipating heat from the inner center of the body;
    a bottom container is located on the upper surface of the inner floor of the body and is configured to support the above heating part from the bottom, and a plurality of third through holes are provided at regular intervals on the side, an insulation support part equipped with an insulation container which supports the heating part to be spaced apart from the bottom container in the vertical direction;
    a lower ring having a cylindrical shape with open-upper and lower surfaces and is inserted between the insulation support and the body to contact the bottom inside the body, an oil tray is provided at the upper side of the lower ring and accommodates a certain water therein, a table ring in which the first penetrating hole is provided at regular intervals on the outer surface, an outer insulating part configured to be spaced apart from the heating part and the insulating support vertically connected to each other by a certain distance toward the direction of the outer surface
    a roasting plate is provided on the upper side of the heating part to receive the heat generated by the heating part to cook the meat, and the oil outlet is provided at regular intervals on the upper side of the oil pan;
    a motor for inhaling air mixed with foreign substances generated from meat placed on a roasting plate on one side of the body into the first air layer formed between the outer insulation and the body through the first penetrating hole, which converts electrical energy into rotational motion;
    a blower consisting of a fan which rotates by the motor to form an air flow;
    a bottom cap having a passage in which the air mixed with foreign substances located in the first air layer flows into the second air layer by the blower, and a second air layer is formed inside;
    a temperature sensor which detectings the temperature of the roasting plate is placed so that the sensing part located at the top is in contact with the bottom of the roasting plate;
    a control box placed outside the body and cuts off the power supplied to the heating lamp when the temperature of the heating part exceeds the set limit;
    a platinum catalyst filter is provided around the outer circumference of the heating part and coated with platinum on a net-shaped ceramic;
    a discharge groove with a gap at a certain interval is provided between the side surface of the heating part and the oil pan;
    one or more of the air of the roasting plate escapes from the body while some of the air are introduced into the first penetrating hole by the blower, flows back into the first air layer through the first air layer, the second air layer, the second through hole, the third through hole, the third air layer, the discharge groove, and the oil outlet, so the process of removing foreign substances generated during the cooking of meat is continuously repeated; and
    wherein the table air circulation roaster for table with a safety function is configured to generate heat in the heating part to the platinum catalyst filter, decomposing nitrogen dioxide in the air generated during the cooking process of meat into nitrogen and oxygen.

2. The air circulating roaster with safety function according to claim 1, further comprising a relay which detects the weight of the roasting plate applied to the temperature sensor, it is provided at the bottom of the temperature sensor, wherein when the roasting plate is removed from the temperature sensor, an electric signal is sent from the relay to the control box to activate the alarm warning lamp formed on one side of the control box and to cut off the power supplied to the heating lamp.

3. The air circulating roaster with safety function according to claim 2, further comprising a control box detecting the current size and pattern of the heating lamp and the motor activating the alarm warning light formed on one side of the control box in the event of an abnormality, and cutting off the supply of power to the place where the abnormality occurs.

4. The air circulating roaster with safety function according to claim 1, wherein the air discharge groove hits the bottom of the roasting plate to induce air to move toward the water in the oil tray, and foreign substances in the air are removed from the air by contacting the water in the oil tray.

5. The air circulating roaster with safety function according to claim 1, further comprising an intake passage provided on the body, which the outside of the body and the first air layer pass through each other a blower is provided inside the intake passage, a blowing hole is provided to let air introduced into the intake passage to be discharged toward the lower side of the first air layer by blower installed between the intake passage and the table ring, air moving toward the lower side of the first air layer through the blowing hole pulls the surrounding air downward by the viscosity of the air, the air on the roasting plate is sucked through the first penetrating hole.

6. The air circulating roaster with safety function according to claim 1, further comprising
- a water tank with an open-top and containing a certain amount of water inside, and placed in the inner center of the bottom cap;
- a heater for heating water contained in the water tank under the water tank to vaporize into a water vapor state;
- a wire mesh is provided at the above the water tank;
- an air circulating roaster for table characterized by following safety function;

a water (water vapor) of the water tank evaporated by the heater is condensed by contact with the wire mesh placed on the upper side of the water tank, and foreign substances in the air are adsorbed by contact with the water condensed in the wire mesh.

7. The air circulating roaster with safety function according to claim 6, further comprising the wire mesh having a larger horizontal area than the water tank, and the center thereof protrudes downward.

8. The air circulating roaster with safety function according to claim 6, wherein a center of wire mesh protrudes downward.

9. The air circulating roaster with safety function according to claim 1, wherein a plasma generator removing foreign substances in the air passing inside the passage, it is provided to penetrate one side of the passage.

10. The air circulating roaster with safety function according to claim 9, wherein an air pipe surrounds the side circumference of the plasma generator and penetrates at both ends; and the blower is located near the air pipe forming an air flow that introduced into the bottom cap, therefore plasma generated by the plasma generator flows into the cap and the body from the air pipe.

\* \* \* \* \*